Patented June 16, 1931

1,810,632

UNITED STATES PATENT OFFICE

VANDERVEER VOORHEES AND EDWARD J. SHAEFFER, OF WHITING, INDIANA, ASSIGNORS TO STANDARD OIL COMPANY, OF WHITING, INDIANA, A CORPORATION OF INDIANA

IMPROVING PRESSURE DISTILLED OIL PRODUCTS

No Drawing.    Application filed December 7, 1925.   Serial No. 73,864.

The present invention relates to the treatment of pressure distilled hydrocarbon products, more particularly of the gasoline type derived by the distillation, at conversion temperatures and under pressure, of heavier hydrocarbon oils.

Cracked distillates such as those referred to above are found to possess a very considerable degree of color instability; that is, their color may be satisfactory at the time of production, but it is found to go off rapidly on standing.

In accordance with the present invention, in order to stabilize the color of the distillate, it is subjected to treatment with dilute sulfuric acid, the strength of which is so controlled that the hydrocarbon constituents of the oil are not attacked and no substantial quantity of sludge is formed. Thus, in the treatment of cracked distillates produced by the distillation of mid-continent hydrocarbon oils under pressure, sulfuric acid of a strength up to about 70% may be employed, such acid not producing any substantial sludge, nor causing any appreciable loss of oil. It is preferred that the acid be of at least 25% concentration, although satisfactory results may be produced with acids having a concentration of as low as 10%. With such weaker acids, it is advisable that relatively larger amounts of the dilute acid be employed. It is preferred to use sulfuric acid of 40 to 60% concentration. The amount of acid employed may vary widely, being primarily determined by the mechanical difficulties of producing intimate mixtures of the acid and the oil to be treated. Thus, one pound of the dilute acid per barrel of oil treated has been found satisfactory. The acid may be repeatedly used for the treatment of fresh batches of oil.

The following specific examples illustrate the present invention:

A pressure distillate derived from a mixture of mid-continent oils, after sweetening, was found to have a color on the Saybolt scale of 19. After forty-two days, the color had gone off to such an extent that the Saybolt color reading was 12, and after four months, 6. The same distillate, treated in accordance with this invention with 50% acid, and subsequently sweetened in the same manner as the untreated distillate had been sweetened, had an initial color of 19; at the end of forty-two days its color on the Saybolt scale was 17 and at the end of four months, 15. Another distillate which, on sweetening, dropped in color from 22 Saybolt to 16 Saybolt in three months maintained a substantially constant color when extracted with acid as hereinbefore described, and subsequently sweetened.

On comparative treatments of a distillate product with varying proportions of acid ranging from 10 to 70%, marked improvement in color stability is produced.

The dilute acid used in the treatment of such distillate products, on neutralization and steam distillation, is found to yield, as a portion of the distillate of such steam distillation, a dark colored product very small in proportion of the distillate treated. This product, when added in the same proportions to a virgin, color stable gasoline, is found to produce the same color instability. The dark colored product recovered from the acid, on exposure to air, becomes gummy and resinifies.

Although the present invention has been described in connection with the specific details of certain embodiments thereof, these details are not intended to be regarded as limitations upon the scope of the invention, except insofar as included in the accompanying claims.

We claim:

1. The method of producing a material capable of readily resinifying on exposure to air which comprises subjecting hydrocarbon pressure distillates of satisfactory initial color oil resulting from the pressure distillation of heavier hydrocarbon oils to the action of dilute sulfuric acid the strength of which is inadequate to produce an appreciable quantity of sludge or substantial impairment of color, removing the acid, neutralizing it, and steam distilling the neutralized acid to remove as an overhead a product which, on exposure to air, becomes gummy and resinifies.

2. The method of producing a material capable of readily resinification on exposure to oil which comprises subjecting hydrocarbon oil pressure distillates of satisfactory initial color to the action of sulfuric acid of a concentration not exceeding 70%, without substantially impairing the color of the distillate or producing an appreciable quantity of sludge, removing the acid, neutralizing it, and steam distilling the neutralized acid to remove as an overhead a product which, on exposure to air, becomes gummy and resinifies.

3. The method of producing color stability in hydrocarbon oil pressure distillates of satisfactory initial color which consists in subjecting such distillates to the action of dilute sulfuric acid, of a concentration not exceeding 70% without substantially modifying the color thereof and adjusting the strength and quantity of such acid with respect to the distillate to prevent the production of an appreciable quantity of sludge and of a substantial impairment of color of the distillate.

4. The method of producing color stability in hydrocarbon oil pressure distillates of satisfactory initial color which consists in subjecting such distillates to the action of dilute sulfuric acid, of a concentration not exceeding 70% without substantially modifying the color thereof and adjusting the strength and quantity of such acid with respect to the distillate to prevent the production of an appreciable quantity of sludge and of a substantial impairment of color of the distillate, and thereafter subjecting the distillate to a sweetening operation.

5. The method of producing color stability in hydrocarbon oil pressure distillates of satisfactory initial color which consists in subjecting such distillates to the action of dilute sulfuric acid, of a concentration substantially less than 40% without substantially modifying the color thereof and adjusting the strength and quantity of such acid with respect to the distillate to prevent the production of an appreciable quantity of sludge and of a substantial impairment of color of the distillate.

6. The method of producing color stability in hydrocarbon oil pressure distillates of satisfactory initial color which consists in subjecting such distillates to the acton of dilute sulfuric acid, having a concentration of from 10 to 25% without substantially modifying the color thereof and adjusting the strength and quantity of such acid with respect to the distillate to prevent the production of an appreciable quantity of sludge and of a substantial impairment of color of the distillate.

VANDERVEER VOORHEES.
EDWARD J. SHAEFFER.